UNITED STATES PATENT OFFICE

2,292,333
REACTION PRODUCT OF AN ALDEHYDE AND DI-(ACETOACETYL) ETHYLENE DIAMINE

Gaetano F. D'Alelio, Pittsfield, Mass., assignor to General Electric Company, a corporation of New York No Drawing. Application October 30, 1941, Serial No. 417,138

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising di-(acetoacetyl) ethylene diamine and an aldehyde, including polymeric aldehydes and aldehyde-addition products, e. g., formaldehyde, paraformaldehyde, dimethylol urea, hexamethylol melamine, etc. Di-(acetoacetyl) ethylene diamine has the structural formula

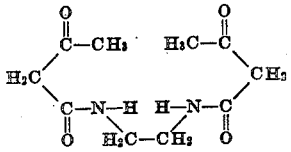

This application is a continuation-in-part of my copending application Serial No. 205,007, filed April 29, 1938, now Patent No. 2,276,828, and assigned to the same assignee as the present invention. Application Serial No. 205,007 is a continuation-in-part of my application Serial No. 169,465, filed October 16, 1937, now Patent No. 2,239,440, issued April 22, 1941.

The present invention is based on the discovery that organic compounds having a methylene group attached to two carbon atoms which are at least double-bonded, and one of which is attached to a nitrogen atom and the other to an organic group that need not be reactive, constitute a class of substances which on reaction with an aldehyde, e. g., formaldehyde, form resinous compositions which are of interest to the plastics, paint and textile industries.

In the parent application I disclosed and claimed compositions of matter comprising the resinous product of reaction of ingredients comprising an aliphatic aldehyde and a methylene-containing nitrogen compound selected from the class of compounds represented by the general formulas (a) 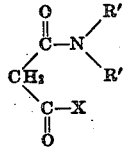

and (b) 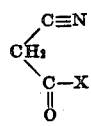

where X is a grouping of the class represented by R and OR, R is a member of the class consisting of alkyl and aryl groupings and R' is a member of the class which is the same as R and, in addition, hydrogen.

The present invention differs from the invention claimed in the parent case in that the methylene-containing nitrogen compound used in producing the compositions of the invention is di-(acetoacetyl) ethylene diamine. Another difference is that the aldehydic reactant may be any aldehyde, including polymeric aldehydes and aldehyde-addition products. Compositions produced by reaction of an aliphatic aldehyde, specifically formaldehyde, with di-(acetoacetyl) ethylene diamine were first disclosed in the parent copending application Serial No. 205,007.

In carrying my invention into effect the initial condensation reaction may be carried out at normal or at elevated temperatures, at atmospheric, sub-atmospheric or super-atmospheric pressures and under neutral, alkaline or acid conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. The primary catalyst advantageously is a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines etc., and (2) nitrogen-containing basic compounds that are aldehyde-reactable, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and di-(acetoacetyl) ethylene diamine may be carried out in the presence of solvents or diluents, fillers, other natural or synthetic resinous bodies, or while admixed with other materials that also can react with the aldehydic reactant or with the di-(acetoacetyl) ethylene diamine. Examples of such modifying reactants are ketones, including halogenated ketones, urea, thiourea, selenourea, iminourea (guanidine), substituted ureas, thioureas, selenoureas and iminoureas, numerous examples of which are given in my various copending applications, for instance in my copending application Serial No. 363,037, filed October 26, 1940; monoamides of monocarboxylic and polycarboxylic acids, e. g., acetamine, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, melem, melon, melam, numerous other examples being given in my various copending applications, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the aldehyde and the di-(acetoacetyl) ethylene diamine by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) an aminotriazine (e. g., melamine) or a urea (e. g., urea itself) or both an aminotriazine and a urea, (2) di-(acetoacetyl) ethylene diamine, and (3) an aldehyde, including polymeric aldehydes and aldehyde-addition products (e. g., formaldehyde, dimethylol urea, trimethylol melamine, hexamethylol melamine, etc.), and thereafter effect reaction between this partial condensation product and, for example, a curing reactant, specially a chlorinated acetamide, to obtain a heat-curable composition. Or, I may form a partial condensation product of ingredients comprising an aldehyde, e. g., formaldehyde, and di-(acetoacetyl) ethylene diamine, and thereafter cause a curing reactant, for example a chlorinated acetamide, to inter-condense with the said partial condensation product.

Some of the condensation products of this invention are thermoplastic materials even at an advanced stage of condensation while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, etc., may be used, for example, in the production of molding compositions.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

Two (2) parts di-(acetoacetyl) ethylene diamine and 1 part paraformaldehyde are gently heated together with stirring until reaction starts at about 120° C. and then cautiously heated until no further reaction occurs. The resinous material that forms is of a pale, light yellow color. It is soluble in boiling hot water and almost insoluble in ethyl alcohol. The resin becomes insoluble and infusible upon heating to 160° C. Acid materials such as phthalic anhydride accelerate the transformation to the infusible state.

*Example 2*

Five (5) parts di-(acetoacetyl) ethylene diamine and 1.77 parts of aqueous formaldehyde containing approximately 37.1% HCHO are mixed together. To this mixture is added 0.05 part sodium hydroxide in 50 parts water. The viscosity of the solution immediately increases and, upon heating, yields clear transparent films with high gloss and which are difficult to scratch with the fingernail. When heated to 160° C. the films become infusible and remain quite flexible. When cloth is impregnated with the syrup and dried, a starched effect is produced.

*Example 3*

Ten (10) parts di-(acetoacetyl) ethylene diamine are added to a mixture of 14.12 parts of aqueous formaldehyde containing about 37.1% HCHO and a solution of 0.1 part sodium hydroxide in 5 parts water. The gel that forms almost immediately is initially firm and clear, is insoluble in water and alcohol after formation and becomes hydrophobic on standing. The water is tenaciously held, but if the gel is spread and heated to 160° C. on a hot plate with the application of pressure, infusible films are formed.

When the above reaction is carried out in the presence of 50 parts water, a similar gel is obtained. This gel becomes opaque on standing. A resin free from water is obtained if 2 parts di-(acetoacetyl) ethylene diamine, 1 part paraformaldehyde, 2 parts butyl alcohol and 0.2 part ethylene diamine are heated together under reflux at the boiling temperature of the mass for from ½ to 1 hour with stirring. Butyl alcohol is a non-solvent.

Example 4

Ninety-four (94) parts phenol, 57 parts di-(acetoacetyl) ethylene diamine, 200 parts of aqueous formaldehyde containing approximately 37.1% HCHO are mixed and heated to effect solution. One part of sodium hydroxide in 10 parts of water is then added and the mixture is heated under reflux at boiling temperature for 30 minutes. A separation of the mass into two phases occurs. On evaporation, a light yellow, water-insoluble resin is obtained. This resin becomes insoluble and infusible on further heating. If, to the syrup before dehydration, there is added 150 to 160 parts of a filler, such as alpha cellulose in flock form, and the product then is dehydrated under vacuum or at 70° C. at atmospheric pressure, a molding (moldable) compound is obtained. This compound may be molded, for example, at 160° C. under a pressure of 2,000 pounds per square inch to yield well-molded articles.

Example 5

| | Parts |
|---|---|
| Di-(acetoacetyl) ethylene diamine | 100 |
| Acetaldehyde | 86 |
| Water | 100 |
| Sodium hydroxide in 20 parts water | 1 | were heated together under reflux for 4 minutes, then in an oven at 50° C. for about 9 hours and, finally, at 100° C. for about 2 hours. The resulting product was a hard, reddish, thermoplastic resin which softened to a gummy, resinous mass when heated on a 150° C. hotplate.

Example 6

| | Parts |
|---|---|
| Di-(acetoacetyl) ethylene diamine | 100 |
| Acrolein | 106 |
| Water | 100 |

To a mixture of the above components was added 2 drops of a solution of 1 part sodium hydroxide in 20 parts water. A violent reaction with the evolution of much heat followed. After the mass had cooled, it was heated at 50° C. for 5 hours and at 100° C. for 4 hours, yielding a pale yellow, fairly hard resin. When this resin was heated on a hot plate at about 150° C. for a few minutes, it melted to a thick, fairly stiff, gummy mass. This resin advantageously may be used as a modifier of other synthetic resins to improve their flow or plasticity characteristics.

The reactions described in the above examples may be carried out in the presence of a urea (e. g., urea itself), an aminotriazine (e. g., melamine) or both a urea and an aminotriazine, or in the presence of a phenol (e. g., phenol itself) or other modifying reactants, numerous examples of which hereinbefore have been given.

Instead of the aldehydes mentioned in the above illustrative examples, I may substitute (in whole or in part) equivalent amounts of aldehyde-addition products, e. g., a methylol urea, specifically monomethylol urea or dimethylol urea, a methylol melamine, e. g., monomethylol melamine or a polymethylol melamine such as trimethylol melamine, hexamethylol melamine, etc., a methylol guanazole, e. g., dimethylol guanazole, etc. Such aldehyde-addition products also may be employed as reactants with di-(acetoacetyl) ethylene diamine and, for example, modifying reactants of the kind specifically mentioned in the preceding paragraph and elsewhere herein.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, substituted ureas, thioureas, selenoureas and iminoureas (numerous examples of which are given in my copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol aminotriazines such, for instance, as the methylol melamines, e. g., mono-, di-, tri-, tetra-, penta- and hexa-methylol melamines. Mixtures of aldehydes and aldehyde-addition products may be employed, for example mixtures of formaldehyde and methylol compounds such, for instance, as dimethylol urea, hexamethylol melamine, etc.

Various proportions of aldehydes may be used in the condensation reaction from an amount insufficient to combine in molecular proportions with the di-(acetoacetyl) ethylene diamine (or with the mixture of the said diamine and other modifying addition agent which is reactable with an aldehyde) to a molecular excess of the aldehyde. For example, 1 mol of di-(acetoacetyl) ethylene diamine may be condensed with from 1 to 7 mols of an aldehyde, specifically formaldehyde, to form masses with different properties. In general, it is desirable that the di-(acetoacetyl) ethylene diamine and the aldehyde be present in the reaction mass in the ratio of 1 mol of the former to at least 1 mol of the latter. When the aldehyde is available for reaction in the form of an aldehyde-addition product such, for instance, as dimethylol urea, hexamethylol melamine, etc., then higher amounts of such aldehyde-addition products ordinarily are used, for example up to 12 or 15 mols of such aldehyde-addition product for each mol of di-(acetoacetyl) ethylene diamine or mixture of such diamine and other addition agent, e. g., urea, melamine, etc., which is reactable with the aldehyde-addition product.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acrylamide, toluene sulfonamides, benzene disulfonamides and trisulfonamides, adipic diamide, phthalamide, etc.; amines such as ethylene diamine, phenylene diamine, etc.; phenol and substituted phenols, including aminophenols, etc.; nitriles, including halogenated nitriles, e. g., acrylonitrile, methacrylonitrile, succinonitrile, chloroacetonitriles, etc.; acylated ureas, including halogenated acylated ureas such as described, for example, in D'Alelio copending applications Serial No. 289,273, filed August 9, 1939, now Patent No. 2,281,559, issued May 5, 1942, and Serial No. 400,649, filed July 1, 1941; and others.

The modifying bodies also may take the form of high molecular weight bodies with or without resinous characteristics, for example, hydrolyzed wood products, formalized cellulose derivatives, lignin, protein-aldehyde condensation products, resins obtained by reaction of an aldehyde with the aminotriazines, the aminodiazines, the aminotriazoles, or the aminodiazoles, alone or admixed with each other or with, for example, urea, malonic diamide, maleic diamide, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers, curing accelerators and various fillers (e. g., wood flour, alpha cellulose, glass fibers, asbestos, including defibrated asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and di-(acetoacetyl) ethylene diamine.

2. A resinous composition comprising the reaction product of ingredients comprising an aliphatic aldehyde and di-(acetoacetyl) ethylene diamine.

3. A composition of matter comprising the resinous product of reaction of ingredients comprising formaldehyde and di-(acetoacetyl) ethylene diamine.

4. A composition of matter comprising the reaction product of ingredients comprising a urea, an aldehyde and di-(acetoacetyl) ethylene diamine.

5. A composition of matter comprising the reaction product of ingredients comprising an aminotriazine, an aldehyde and di-(acetoacetyl) ethylene diamine.

6. A composition of matter comprising the reaction product of ingredients comprising a phenol, an aldehyde and di-(acetoacetyl) ethylene diamine.

7. A resinous composition comprising the product of reaction, under alkaline conditions, of ingredients comprising an aldehyde and di-(acetoacetyl) ethylene diamine.

8. A resinous composition comprising the product of reaction of ingredients comprising di-(acetoacetyl) ethylene diamine, urea and formaldehyde.

9. A composition comprising the resinous product of reaction of ingredients comprising di-(acetoacetyl) ethylene diamine, melamine and formaldehyde.

10. A resinous composition produced by the co-condensation of phenol and di-(acetoacetyl) ethylene diamine with formaldehyde.

11. A composition comprising the resinous reaction product of ingredients comprising a methylol urea and di-(acetoacetyl) ethylene diamine.

12. A resinous composition comprising the product of reaction of ingredients comprising dimethylol urea and di-(acetoacetyl) ethylene diamine.

13. A composition comprising the resinous reaction product of ingredients comprising a methylol aminotriazine and di-(acetoacetyl) ethylene diamine.

14. A composition comprising the resinous product of reaction of ingredients comprising urea, a polymethylol melamine and di-(acetoacetyl) ethylene diamine.

15. A composition comprising the product of reaction of (1) a partial condensation product of ingredients comprising an aldehyde and di-(acetoacetyl) ethylene diamine, and (2) a chlorinated acetamide.

16. A heat-curable composition comprising the heat-convertible reaction product of (1) a partial condensation product of ingredients comprising urea, formaldehyde and di-(acetoacetyl) ethylene diamine, and (2) a chlorinated acetamide.

17. A product comprising the heat-cured composition of claim 16.

18. The method of producing new synthetic compositions which comprises effecting reaction between ingredients comprising an aldehyde and di-(acetoacetyl) ethylene diamine.

19. The method which comprises forming a partial condensation product of ingredients comprising formaldehyde and di-(acetoacetyl) ethylene diamine, and causing a chlorinated acetamide to intercondense with the said partial condensation product.

GAETANO F. D'ALELIO.